United States Patent
Laimböck

(12) 
(10) Patent No.: US 6,666,186 B2
(45) Date of Patent: Dec. 23, 2003

(54) SPARK IGNITED INTERNAL COMBUSTION ENGINE WITH AT LEAST ONE CYLINDER

(75) Inventor: Franz Laimböck, Thal (AT)

(73) Assignee: AVL List GmbH, Graz (AT)

( * ) Notice: Subject to any disclaimer, the term of this patent is extended or adjusted under 35 U.S.C. 154(b) by 62 days.

(21) Appl. No.: 10/060,149

(22) Filed: Feb. 1, 2002

(65) Prior Publication Data

US 2002/0129787 A1 Sep. 19, 2002

(30) Foreign Application Priority Data

Feb. 1, 2001 (AT) .......................................... 80/2001 U
Jul. 23, 2001 (AT) .......................................... 582/2001 U

(51) Int. Cl.$^7$ ................................................ F02D 9/08
(52) U.S. Cl. ........................ 123/302; 123/336; 123/432; 123/306
(58) Field of Search ................................ 123/306, 305, 123/308, 432, 336, 337

(56) References Cited

U.S. PATENT DOCUMENTS

| 5,305,720 | A | | 4/1994 | Ando et al. | |
|---|---|---|---|---|---|
| 5,720,255 | A | * | 2/1998 | Yoshikawa | 123/337 |
| 5,816,215 | A | * | 10/1998 | Yoshikawa et al. | 123/301 |
| 5,819,706 | A | * | 10/1998 | Tsuchida et al. | 123/432 |
| 6,047,592 | A | * | 4/2000 | Wirth et al. | 123/307 |
| 6,138,639 | A | * | 10/2000 | Hiraya et al. | 123/295 |
| 6,155,229 | A | * | 12/2000 | Cantrell | 123/336 |
| 2001/0018905 | A1 | * | 9/2001 | Higashi et al. | 123/302 |

FOREIGN PATENT DOCUMENTS

| DE | 2146015 | 4/1973 |
|---|---|---|
| DE | 2854332 | 6/1979 |
| DE | 19849913 | 5/2000 |
| EP | 01786663 | 4/1986 |
| GB | 23100033 | 8/1997 |
| JP | 04136417 | 5/1992 |
| JP | 08246877 | 9/1996 |

* cited by examiner

Primary Examiner—Thomas N. Moulis
(74) Attorney, Agent, or Firm—Dykema Gossett PLLC

(57) ABSTRACT

The invention relates to a spark ignited internal combustion engine with at least one cylinder that accommodates a reciprocating piston, with a cylinder head that receives at least one ignition device per cylinder and in which are formed one exhaust and two intake manifolds, said exhaust manifold communicating with a combustion chamber by way of one exhaust port and said intake manifolds communicating therewith by way of intake ports, said exhaust port being controlled via an exhaust valve and said intake ports via intake valves, said exhaust port on the one hand and said intake ports on the other hand being arranged to different sides of an elevated plane of the engine that passes through the axis of the cylinder and through the axis of the crankshaft, said intake manifolds being at least in sections arranged substantially in the direction of the cylinder's axis and being formed in such a manner that a reverse tumble flow is initiated in the combustion chamber, said flow being oriented from the intake ports toward the piston and from there toward the exhaust port. In order to reduce the flow losses in the combustion chamber in the easiest possible manner, there is provided that at least one ignition device be arranged in the cylinder head bottom to the side thereof in the region of the cylinder wall.

18 Claims, 5 Drawing Sheets

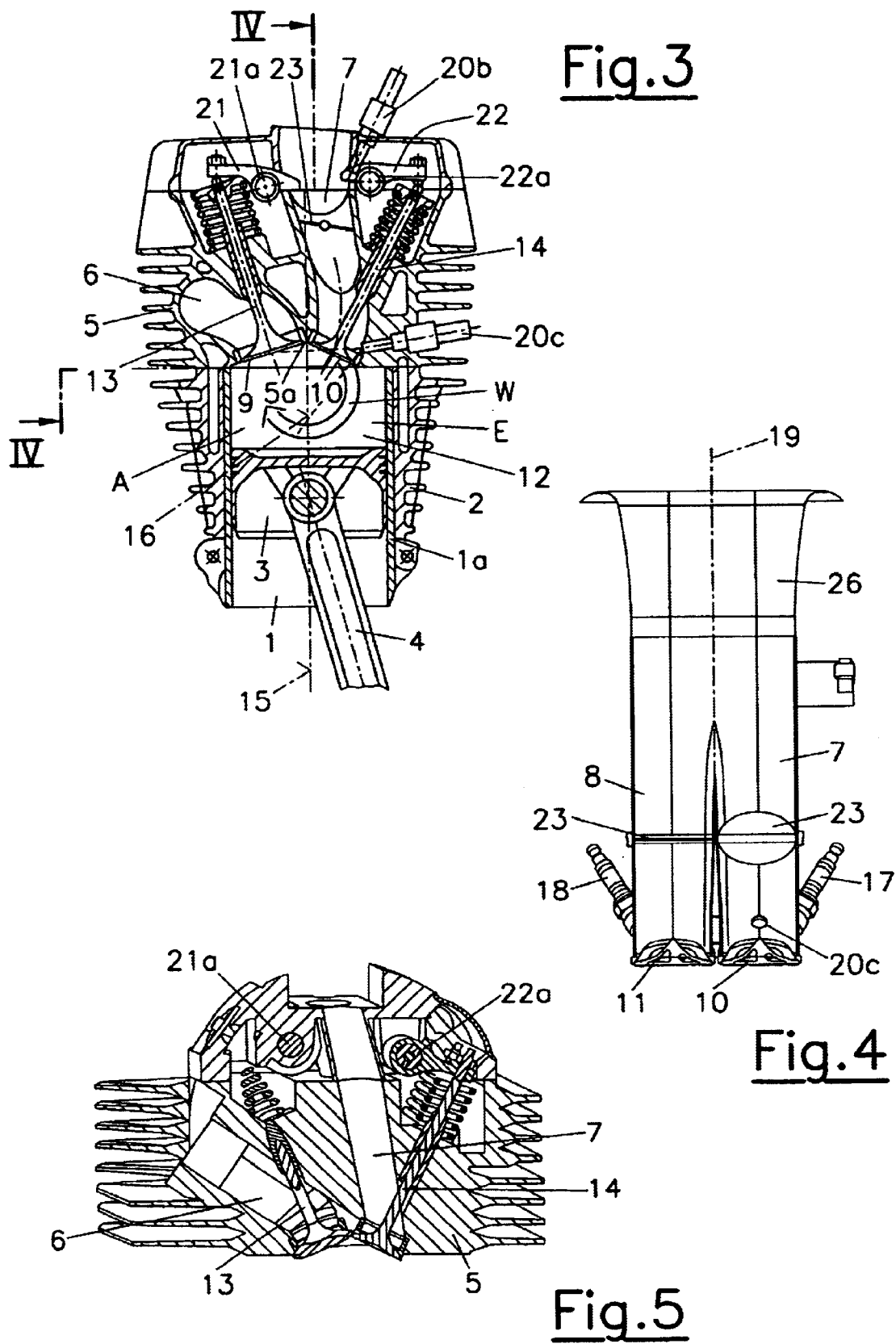

SPARK IGNITED INTERNAL COMBUSTION ENGINE WITH AT LEAST ONE CYLINDER

BACKGROUND OF THE INVENTION

The invention relates to a spark ignited internal combustion engine with at least one cylinder that accommodates a reciprocating piston, with a cylinder head that receives at least one ignition device per cylinder and in which are formed one exhaust and two intake manifolds, said exhaust manifold communicating with a combustion chamber by way of an exhaust port and said intake manifolds communicating therewith by way of intake ports, said exhaust port being controlled via an exhaust valve and said intake ports via intake valves, said exhaust port on the one hand and said intake ports on the other hand being arranged to different sides of an elevated plane of the engine that passes through the axis of the cylinder and through the axis of the crankshaft, said intake manifolds being at least in sections arranged substantially in the direction of the cylinder's axis and being formed in such a manner that a reverse tumble flow is initiated in the combustion chamber, said flow being oriented from the intake ports toward the piston and from there toward the exhaust port.

DESCRIPTION OF PRIOR ART

An internal combustion engine with two intake manifolds and one exhaust manifold is described in U.S. Pat. No. 5,305,720, the intake manifolds initiating a reverse tumble flow in the combustion chamber. Particularly on lean operation, carburetion, combustion and scavenging of the combustion chamber may be improved by virtue of this reverse tumble flow. However, the ignition device, which is arranged in the region of the cylinder's axis and projects into the combustion chamber occasions relatively high flow losses as the ignition device is positioned in a region of high flow velocities. In three-valve internal combustion engines with tumble flow in particular, the central positioning, which offers itself, of the ignition device is inconvenient on account of the high flow velocities prevailing therein and of the adverse combustion initiation.

The GB 2 310 003 A describes an internal combustion engine with reverse tumble flow with four valves per cylinder in which the ignition device discharges slantways between the valves in a central region of the combustion chamber.

The JP 08-246877 A also discloses an internal combustion engine with four valves and one central spark plug. Here too, high flow velocities may be observed in the region of the ignition device.

The JP 04-136417 A indicates an internal combustion engine with reverse tumble flow with three intake and two exhaust valves and with several ignition devices per cylinder. The ignition devices are each arranged in a central region between two valves. The high flow velocities and the strong turbulences prevailing in the region of the ignition devices do not permit to guarantee a uniform combustion of the mixture.

The publications EP 0 178 663 A2 and DE 28 54 332 A1 describe internal combustion engines with two intake valves and one exhaust valve per cylinder in which a swirl flow is produced around the cylinder's axis by means of one main and one auxiliary intake manifold. The ignition device is arranged in a region with medium swirl flow that is located near the intake. This idea cannot be used for internal combustion engines with reverse tumble flow in the combustion chamber.

Furthermore, the DE 198 49 913 A1 discloses an internal combustion engine with two intake valves and with one exhaust valve per cylinder. One spark plug is thereby arranged between the intake valve and a respective one of the exhaust valves. In the combustion chamber, there is produced a tumble flow which is oriented from the intake side toward the exhaust side and not a reverse tumble flow that is directed from the intake ports toward the piston and from there toward the exhaust port.

SUMMARY OF THE INVENTION

It is the object of the invention to avoid these drawbacks and to reduce the flow losses in an internal combustion engine of the type mentioned herein above in the easiest possible manner.

This is achieved in accordance with the invention by arranging at least one ignition device in the cylinder head bottom to the side thereof in the region of the cylinder wall. The ignition device thereby discharges into the combustion chamber at a non-critical location of the cylinder head ceiling where the reverse tumble flow produces relatively low flow velocities.

Preferably, at least one ignition device is arranged in the region of the elevated plane of the engine. In the region of the elevated plane of the engine there is enough space for arranging the ignition device laterally so that there are hardly any constructional restraints. Furthermore, the lateral arrangement of the ignition device has the advantage that intake and exhaust ports may be devised with larger dimensions than in an ignition device that is centrally arranged.

A particularly good combustion initiation can be achieved when at least two ignition devices are arranged in the cylinder head bottom on either side of a transverse plane of the engine that includes the cylinder's axis and is oriented normal to the elevated plane of the engine. The arrangement of the three valves in the cylinder head has the advantage of offering enough space for two ignition devices as well. In a particularly preferred embodiment, the ignition devices may thereby be arranged symmetrically about the transverse plane of the engine. The intake ports and the exhaust port too may be arranged symmetrically about the transverse plane of the engine.

In another variant in accordance with the invention there are provided three ignition devices in the cylinder head bottom, a first ignition device being arranged between the two intake ports, a second ignition device between the one intake port and the exhaust port and a third ignition device between the other intake port and the exhaust port. The three ignition devices thereby discharge into the combustion chamber at non-critical locations of the cylinder head ceiling where the reverse tumble flow produces relatively low flow velocities. The three ignition devices permit to achieve a uniform combustion of the fuel-air mixture in the combustion chamber.

The second and the third ignition devices are preferably arranged in the region of the elevated plane of the engine. In the region of the elevated plane of the engine there is enough space for arranging the ignition device laterally so that there are hardly any constructional restraints. Furthermore, the lateral arrangement of the ignition device has the advantage that intake and exhaust ports may be devised with larger dimensions than in an ignition device that is centrally arranged.

A particularly good combustion initiation can be achieved when the second and the third ignition devices are arranged in the cylinder head bottom to either side of a transverse plane of the engine that includes the cylinder's axis and is oriented normal to the elevated plane of the engine. The arrangement of the three valves in the cylinder head has the advantage of offering enough space for three ignition devices as well. In a particularly preferred embodiment, the ignition devices may thereby be arranged symmetrically about the transverse plane of the engine. The intake ports and the exhaust port too may be arranged symmetrically about the transverse plane of the engine.

To dispense with one component part in the region of the cylinder's axis furthermore has the advantage that the intake manifolds may be optimally adapted to produce the reverse tumble flow. To have at least one intake manifold crossing the elevated plane of the engine is of particular advantage.

In a particularly preferred variant of the invention the intake manifolds are arranged—in horizontal projection—between at least one lever axis of the intake valve and one lever axis of the exhaust valve. This permits on the one hand to optimally form the reverse tumble flow and on the other hand to offer enough space for the ignition devices. Furthermore, there may also provided that six cylinder head bolts for fastening the cylinder head on the cylinder housing are arranged with rotational symmetry about the cylinder. By virtue of the intake manifolds that are arranged in the direction of the cylinder's axis, the cylinder head bolts may be arranged at regular intervals around the circumference of the cylinder without any constructional restraints arising with regard to the design of the intake manifolds or of the cylinder head. By having the cylinder head uniformly pressed against the cylinder housing, high compression ratios may be realized. An internal combustion engine with two swirl producing intake manifolds per cylinder in which each cylinder head is fastened to the cylinder housing by means of six cylinder head bolts forms the subject of the DE 21 46 015 A. The six cylinder bolts provide but little liberty in designing and guiding the manifolds. According to the DE 21 46 015 A, the fastening of the cylinder head by means of six cylinder head bolts per cylinder is mainly made possible by two relatively angled intake flange areas per cylinder which presents the disadvantages that manufacturing is more complicated and that more space is required.

In another embodiment of the invention there is provided that the two intake manifolds start at one common suction channel that is arranged between at least one lever axis of the intake valve and one lever axis of the exhaust valve. For a simple design of the channel the suction channel may advantageously have an oval or a rectangular section with rounded angles.

A device for controlling the intake air is arranged in the suction channel or in the intake manifolds. The device for controlling the intake air may consist of two control flaps that are coupled to one another, one of the two control flaps being provided for each of the intake manifolds. The control flaps are preferably relatively phase-shifted, i.e., one control flap causes one intake manifold to open at an earlier stage than the other.

Alternatively, a rotary slide valve may be arranged in the region where the suction channel branches into the intake manifolds, the axis of rotation of said rotary slide valve being arranged substantially crosswise relative to the suction channel and preferably parallel to the axis of the crankshaft.

Optimal control of the intake air may be achieved when the rotary slide valve is provided with one control port for each intake manifold, the control ports being preferably arranged in such a manner that they are relatively phase-shifted.

In another embodiment of the invention there is provided that an injection device for the semi-direct injection of fuel discharges into at least one intake manifold, preferably into that intake manifold that is opened first by the device for controlling the intake air.

To dispense with one component part in the region of the cylinder's axis has furthermore the advantage that the intake manifolds may be optimally laid out for producing the reverse tumble flow. It is thereby of particular advantage when at least one intake manifold crosses the elevated plane of the engine.

The fuel may be fed directly into the combustion chamber by way of an injection device that is arranged to the side between the two intake ports.

Alternatively, there may be provided that an injection device for the semi-direct injection of fuel that occurs in synchronism with suction discharges into at least one intake manifold, preferably into that intake manifold that is opened first by the device for controlling the intake air. As compared to the direct fuel injection, this has the advantage that the fuel injection device does not coke and that the fuel may be injected with considerably lower injection pressure.

In a particularly easy to produce variant there is provided that each intake manifold may be formed by and released from a steel mold that is provided with a slope.

BRIEF DESCRIPTION OF THE DRAWINGS

The invention is explained herein after in greater detail with reference to the drawing.

FIG. 3 is a sectional view of the inventive internal combustion engine through a cylinder in a second variant, FIG. 4 is a sectional view of the inventive internal combustion engine taken along line IV—IV of FIG. 3, FIG. 5 is a sectional view of the inventive internal combustion engine through a cylinder in a third variant.

DETAILED DESCRIPTION OF THE PREFERRED EMBODIMENTS

Figure 1:
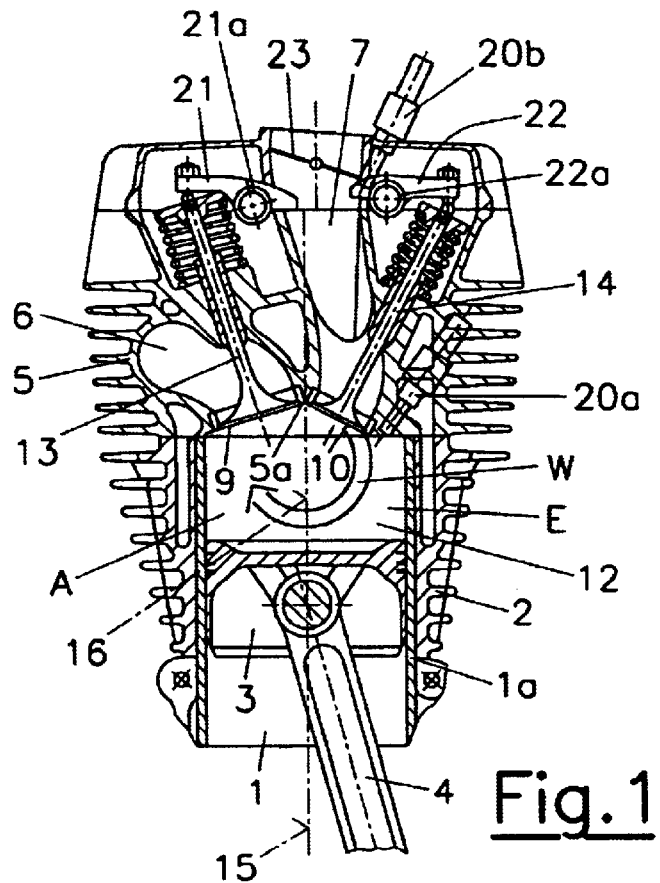
FIG. 1 is a sectional view of an inventive internal combustion engine through a cylinder across the axis of the crankshaft in a first variant of the invention.

Components that provide the same function will bear the same reference numerals throughout the variants of the invention.

A reciprocating piston 3 is movably arranged in a cylinder 1 of a cylinder housing 2. The cylinder wall of cylinder 1 is labelled with the numeral 1*a*. The connecting rod which connects piston 3 with a crankshaft 25 is indicated at 4.

One exhaust manifold 6 and two intake manifolds 7, 8 are formed in the cylinder head 5. The exhaust channel 6 communicates with the combustion chamber 12 by way of an exhaust port 9 and the intake manifolds 7, 8 communicate with said combustion chamber by way of intake ports 10 and 11. The exhaust port 9 is controlled via an exhaust valve 13 and the intake ports 10 and 11 via intake valves 14.

The exhaust and intake ports 9, 10, 11 formed in the cylinder head bottom 5a are located to different sides A, E of an elevated plane of the engine that passes through the cylinder's axis 15 and through the axis 25a of crankshaft 25. A indicates the exhaust side and E the intake side. The exhaust port 9 and the intake ports 10 and 11 are symmetrical about a transverse plane of the engine 19 that is oriented through the cylinder's axis 15 normal to the elevated plane of the engine 16.

The intake manifolds 7, 8 are formed in the cylinder head 5 in such a manner that a reverse tumble flow W is initiated in combustion chamber 12, said tumble flow being directed from the intake ports 10, 11 toward the piston 3 and from there toward the exhaust port 9 in the cylinder head bottom 5a. The intake manifolds 7, 8 are at least in sections arranged approximately parallel to the cylinder's axis 15.

Figure 2:
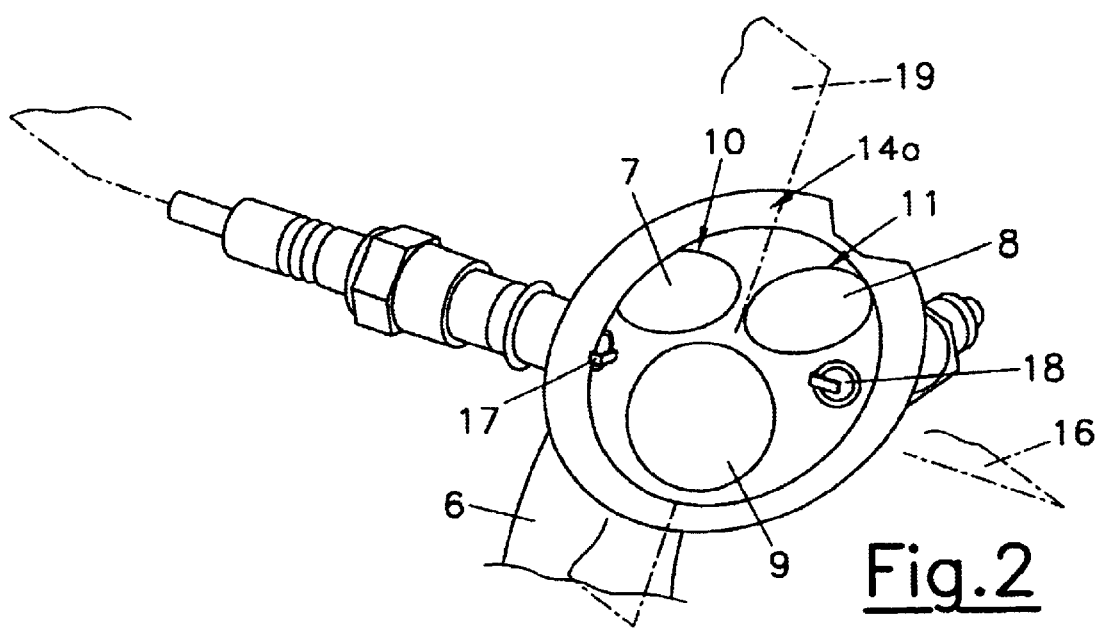
FIG. 2 is an oblique view of the cylinder head bottom of said internal combustion engine.
Figure 6:
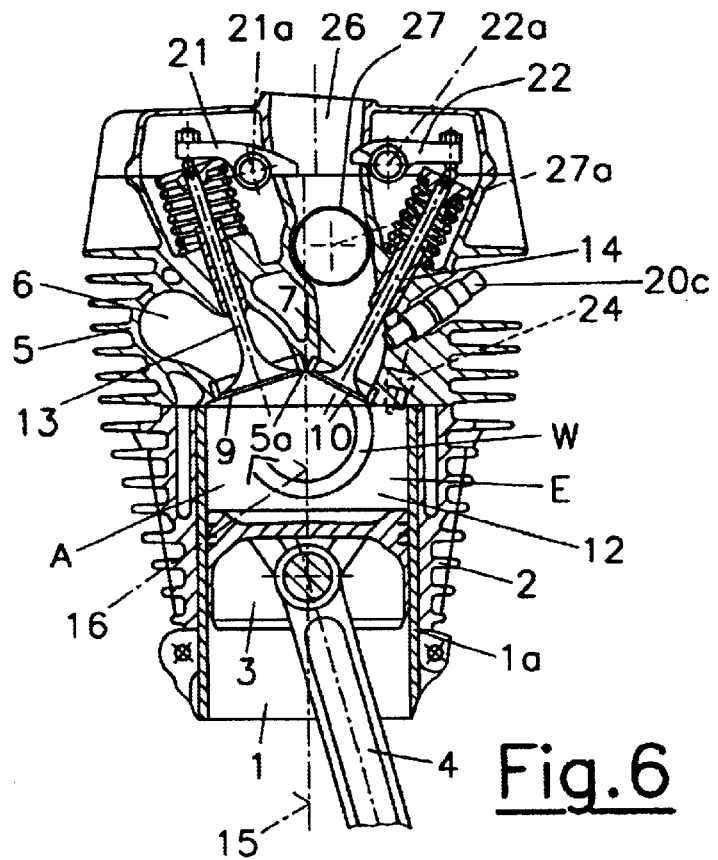
FIG. 6 is a sectional view of the inventive internal combustion engine through a cylinder in a fourth variant.
Figure 7:
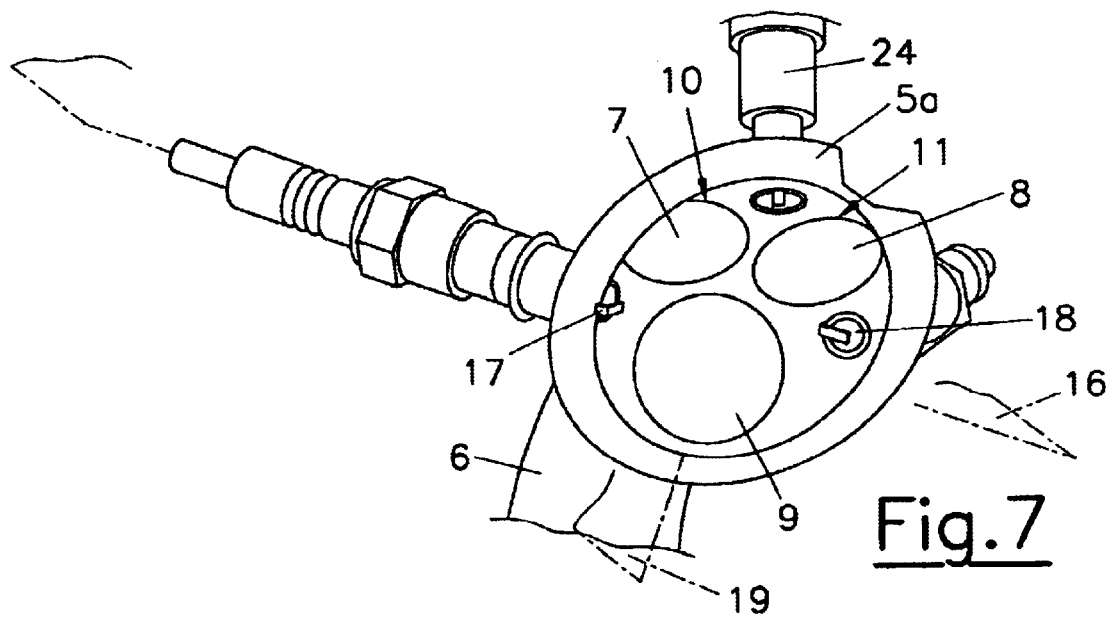
FIG. 7 is an oblique view of the cylinder head bottom of said internal combustion engine.
Figure 8:
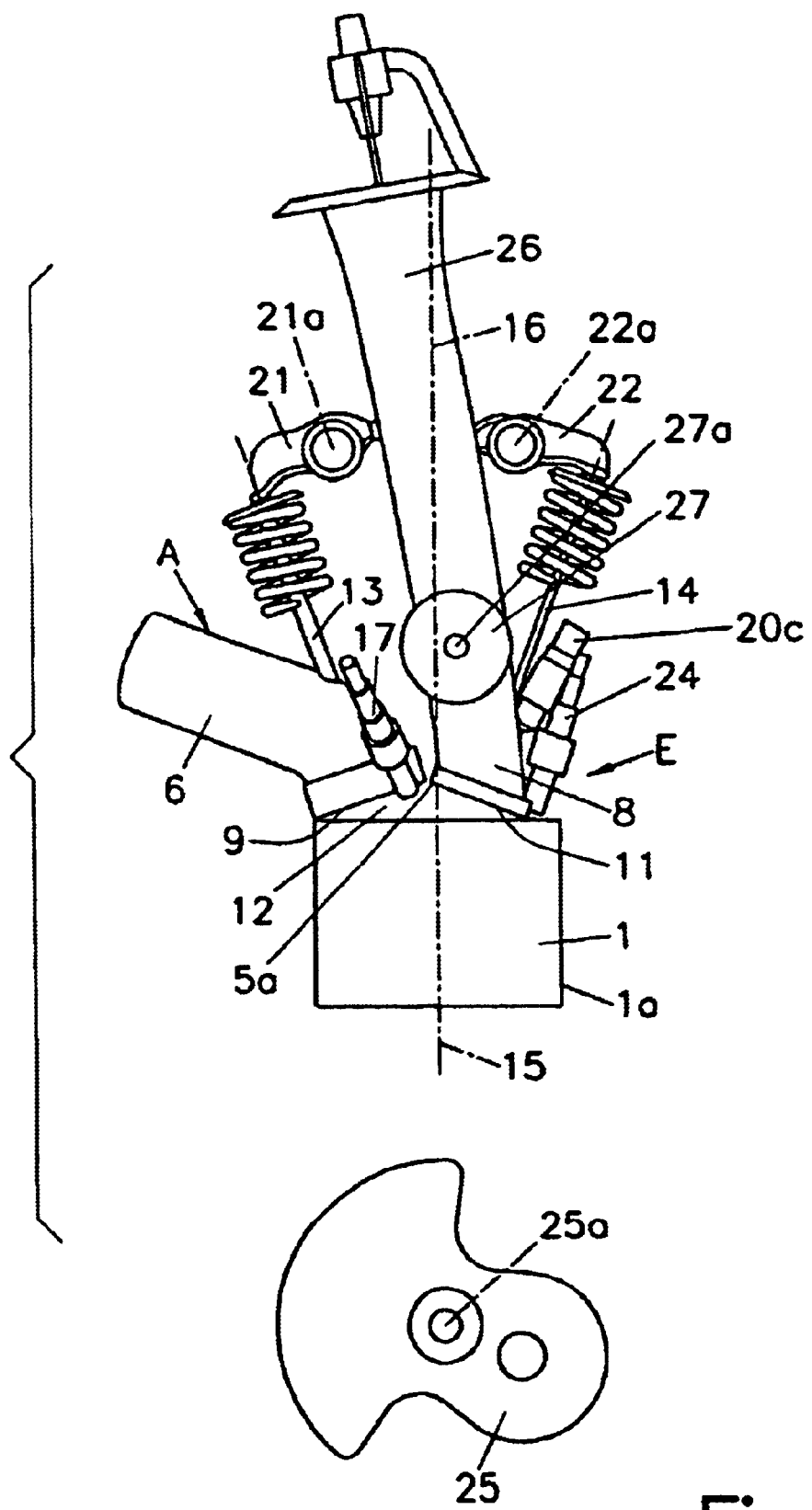
FIG. 8 is a longitudinal view of a cylinder of said internal combustion engine and FIG. 9 is a top view of a cylinder of said internal combustion engine.

In the exemplary embodiment illustrated in the FIGS. 1 and 2, two ignition devices 17, 18, which are arranged in the cylinder head bottom 5a, discharge into the combustion chamber 12 in the region of the elevated plane of the engine 16. The ignition devices 17, 18 are symmetrically arranged to different sides about a transverse plane of the engine 19 that is oriented through the cylinder's axis 15 normal to the elevated plane of the engine 16. The exhaust port 9 and the intake ports 10 and 11 too are symmetrical about the transverse plane of the engine 19.

In the exemplary embodiment shown in the FIGS. 6 through 9, three ignition devices 24, 17, 18 are arranged in the region of the cylinder wall 1a. The first ignition device 24 is thereby located between the two intake ports 10, 11 in the region of the transverse plane of the engine 19. The second and third ignition devices 17, 18 are each arranged between one intake port 10, 11 and one exhaust port 9. The second and third ignition device 17, 18 is thereby positioned in the region of the elevated plane of the engine 16. The ignition devices 17, 18 are arranged symmetrically to different sides relative to the transverse plane of the engine 19. Uniform combustion of the fuel-air mixture in the combustion chamber 12 is made possible by the symmetrical arrangement of the ignition devices 17, 18, 24.

As can be surveyed from the FIGS. 4 and 6 through 9, the intake manifolds 7, 8 may originate from one common suction channel 26. At least one of the intake manifolds 7, 8 or the common suction channel 26 may thereby cross the elevated plane of the engine 16. A very strong reverse tumble flow W may thus be produced in the combustion chamber 12.

The control of the intake air is performed by a device that is arranged in the suction channel or in the two intake manifolds 7, 8. The device for controlling the intake air may for example consist of two control flaps 23 that are coupled together, each control flap 23 being positioned in a respective one of the intake manifolds 7, 8. The control flaps 23 are slightly phase-shifted relative to each other so that one of the two intake manifolds 7 is opened at a slightly earlier stage as shown in FIG. 4.

As shown in the FIGS. 6 through 9, the device for controlling the intake air may also be formed by a rotary slide valve 27. The suction channel 26 thereby has an oval section as can be surveyed from FIG. 9. The rotary slide valve 27 is provided in the region in which the intake manifolds 7, 8 branch off the common suction channel 26. The axis of rotation 27a of the rotary slide valve 27 is substantially arranged crosswise to the suction channel 26.

Figure 9:
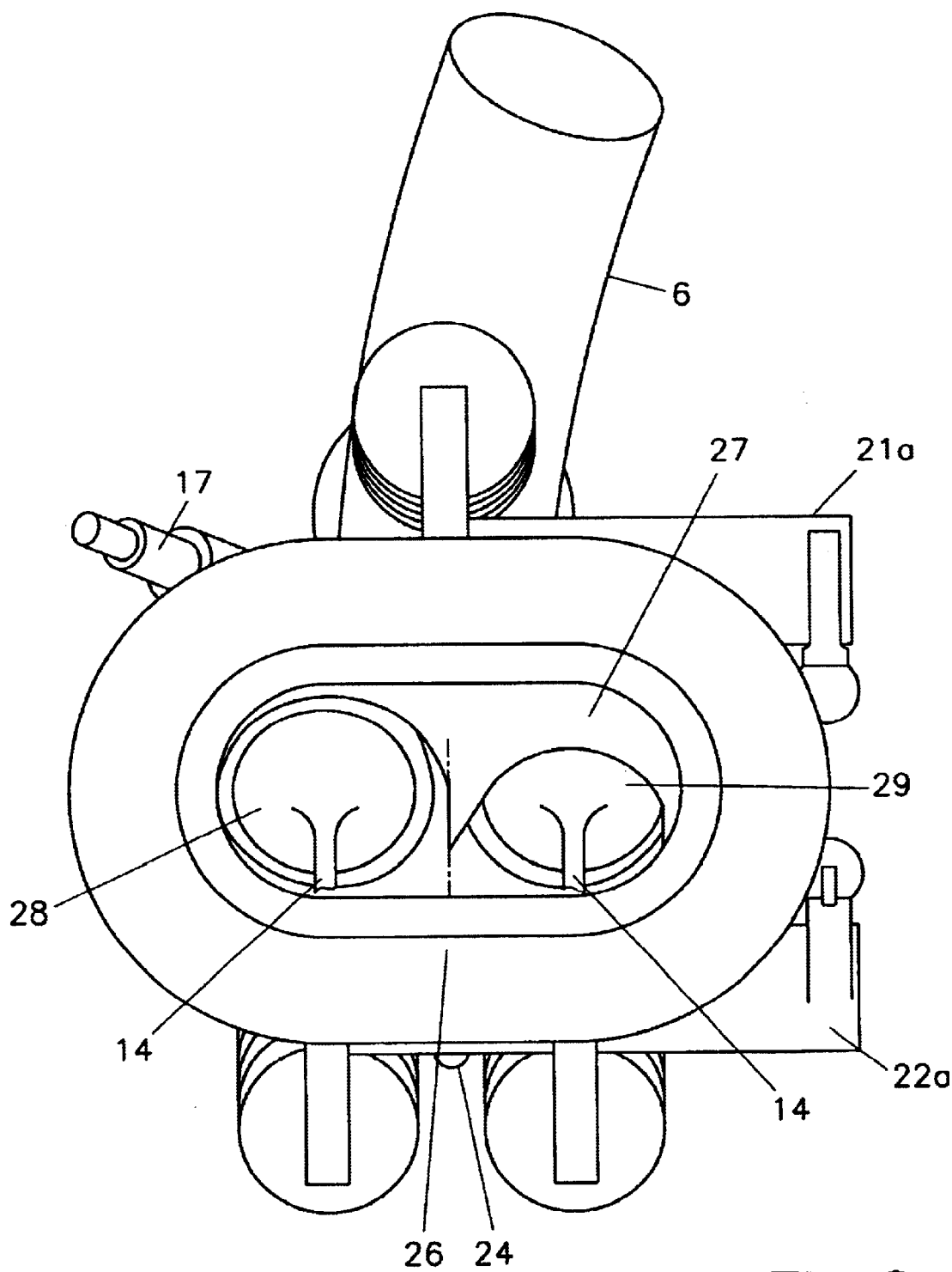

As can be surveyed from FIG. 9, the rotary slide valve 27 is provided with one control port 28, 29 for each of the intake manifolds 7, 8. The control ports 28, 29 are phase-shifted so that the intake manifolds 7, 8 may be controlled one upon the other.

As can be seen in the FIGS., the suction channel 26 is arranged in each embodiment between at least one lever axis of an intake valve 22a and the lever axis of the exhaust valve 21a. This permits on the one hand to optimally produce a reverse tumble flow W in the combustion chamber 12 and on the other hand offers sufficient space for arranging three ignition devices 17, 18, 24 per cylinder 1. In the exemplary embodiment, the exhaust valve lever 21 and the intake valve levers 22 are designed as rocker levers.

In that the space is optimally used, it is also possible to connect the cylinder head 5 per cylinder 1 to the cylinder housing 2 by means of six cylinder head bolts that are arranged at regular intervals about the cylinder 1. This permits to achieve an optimal sealing between cylinder head 5 and cylinder housing 2 even at higher compression ratios.

As compared to a central arrangement of an ignition device, the lateral arrangement of the ignition devices 17, 18, 24 in a region with relatively low flow velocities permits to considerably reduce the flow losses. Combustion and emissions are thus improved and fuel consumption lowered.

FIG. 5 shows an exemplary embodiment in which the intake manifolds 7, 8 may be produced by diecasting. In order to remove the intake manifolds 7, 8 from a casting mould made of steel and provided with a slope, the intake manifolds 7, 8 are of a straight design and the shortest possible.

As can be surveyed from FIG. 1, the fuel may be injected directly into the combustion chamber 12 by way of a fuel injection device 20a that is arranged laterally in the region of the transverse plane of the engine 19 between the two intake ports 10, 11. Alternatively or in addition, the fuel may also be injected by means of at least one fuel injection device 20b, 20c that discharges indirectly into one intake manifold 7, 8. Variants with indirect injection into the intake manifold 7 only are illustrated in the FIGS. 3 and 4 on the one hand and in the FIGS. 6 through 9 on the other hand. Indirect fuel injection into one of the two intake manifolds has the advantage that the fuel injection device 20b, 20c hardly cokes and that the injection pressures used may be substantially lower. Part load operation in particular is improved and the response behavior achieved is fast when the injection device 20c discharges directly before the intake port 10 into that intake manifold 7 that is opened first by the control flaps 23 or by the control port 28 of rotary slide valve 27 so that a semi-direct fuel injection that occurs in synchronism with suction may be carried out.

What is claimed is:

1. A spark ignited internal combustion engine with at least one cylinder that accommodates a reciprocating piston, with a cylinder head that receives at least one ignition device per cylinder and in which are formed one exhaust and two intake manifolds, said exhaust manifold communicating with a combustion chamber by way of one exhaust port and said intake manifolds communicating therewith by way of intake ports, said exhaust port being controlled via an exhaust valve and said intake ports via intake valves, said exhaust port on the one hand and said intake ports on the other hand being arranged on different sides of an elevated plane of the engine that passes through an axis of the cylinder and through an axis of a crankshaft, said intake manifolds being at least in sections arranged substantially in the direction of the cylinder's axis and being formed in such a manner that a reverse tumble flow is initiated in the combustion chamber, said flow being oriented from the intake ports toward the piston and from there toward the exhaust port, wherein at least one ignition device is arranged in a cylinder head bottom to the side thereof in a region of a cylinder wall wherein the intake manifolds are arranged—in horizontal projection—between at least one lever axis of an intake valve lever for activation of the intake valve and one lever axis of an outlet valve lever for activation of the exhaust valve, with at least one injection device that discharges into at least one intake manifold, wherein the injection device is arranged directly before the intake port in such a way that the semi-direct injection of fuel in synchronism with suction may be realized and wherein two ignition devices are arranged in the cylinder head bottom on either side of a transverse plane of the engine that includes the cylinder's axis and is oriented normal to the elevated plane of the engine.

2. The internal combustion engine according to claim 1, wherein at least one ignition device is arranged in a region of an elevated plane of the engine.

3. The internal combustion engine according to claim 1, wherein at least two ignition devices are arranged symmetrically about the transverse plane of the engine.

4. The internal combustion engine according to claim 1, wherein three ignition devices are provided in the cylinder head bottom, a first ignition device being arranged between the two intake ports, a second ignition device between the one intake port and the exhaust port and a third ignition device between the other intake port and the exhaust port.

5. The internal combustion engine according to claim 1, wherein the exhaust port and the intake ports are arranged symmetrically about the transverse plane of the engine.

6. The internal combustion engine according to claim 1, wherein at least one intake manifold crosses the elevated plane of the engine.

7. The internal combustion engine according to claim 1, wherein six cylinder head bolts for fastening the cylinder head to a cylinder housing are arranged with rotational symmetry about the cylinder.

8. The internal combustion engine according to claim 1, wherein a device for controlling an intake air is arranged in a suction channel or in the intake manifolds.

9. The internal combustion engine according to claim 8, wherein the device for controlling the intake air consists of two control flaps that are coupled to one another, one of the two control flaps being provided for a respective one of the intake manifolds.

10. The internal combustion engine according to claim 9, wherein the control flaps are relatively phase-shifted so that one control flap causes one of the two intake manifold to open at an earlier stage.

11. The internal combustion engine according to claim 8, wherein a rotary slide valve constituting the device for controlling the intake air is arranged in the region where a suction channel branches into the intake manifolds, an axis of rotation of said rotary slide valve being arranged substantially crosswise relative to the suction channel.

12. The internal combustion engine according to claim 11, wherein the axis of rotation of said rotary slide valve is arranged parallel to the axis of the crankshaft.

13. The internal combustion engine according to claim 11, wherein the rotary slide valve is provided with one control port for each intake manifold.

14. The internal combustion engine according to claim 13, wherein the control ports are arranged in such a manner that they are relatively phase-shifted.

15. The internal combustion engine according to claim 11, wherein the suction channel has an oval section.

16. The internal combustion engine according to claim 11, wherein the suction channel has a rectangular section with rounded angles.

17. The internal combustion engine according to claim 1, wherein the injection device discharges into that intake manifold that is opened first by the device for controlling the intake air.

18. The internal combustion engine according to claim 1, wherein each intake manifold may be formed by and released from a steel mold that is provided with a slope.

* * * * *